United States Patent [19]
Emslander et al.

[11] Patent Number: 5,721,086
[45] Date of Patent: Feb. 24, 1998

[54] IMAGE RECEPTOR MEDIUM

[75] Inventors: Jeffrey O. Emslander, Afton; Charles C. Lee, Little Canada, both of Minn.

[73] Assignee: Minnesota Mining And Manufacturing Company, St. Paul, Minn.

[21] Appl. No.: 687,271

[22] Filed: Jul. 25, 1996

[51] Int. Cl.$^6$ .................................................. G03G 13/14
[52] U.S. Cl. ........................ 430/126; 428/483; 428/513; 156/243
[58] Field of Search ..................... 428/195, 212, 428/323, 325, 327, 483, 516; 430/126; 156/243

[56] References Cited

U.S. PATENT DOCUMENTS

| | | | |
|---|---|---|---|
| 4,713,272 | 12/1987 | Freedman | 428/40 |
| 4,737,224 | 4/1988 | Fitzer et al. | 156/240 |
| 4,837,088 | 6/1989 | Freedman | 156/243 |
| 4,888,075 | 12/1989 | Freedman | 156/243 |
| 4,925,714 | 5/1990 | Freedman | 428/40 |
| 4,946,532 | 8/1990 | Freedman | 156/143 |
| 4,966,804 | 10/1990 | Hasegawa et al. | 428/203 |
| 5,013,625 | 5/1991 | Takizawa | 430/64 |
| 5,045,391 | 9/1991 | Brandt et al. | 428/336 |
| 5,106,710 | 4/1992 | Wang et al. | 430/42 |
| 5,114,520 | 5/1992 | Wang, Jr. et al. | 156/240 |
| 5,143,570 | 9/1992 | Freedman | 156/230 |
| 5,262,259 | 11/1993 | Chou et al. | 430/47 |
| 5,264,291 | 11/1993 | Shinozaki | 428/534 |
| 5,342,688 | 8/1994 | Kitchin et al. | 428/402 |
| 5,372,669 | 12/1994 | Freedman | 156/243 |
| 5,372,987 | 12/1994 | Fisch et al. | 428/195 |
| 5,389,723 | 2/1995 | Iqbal et al. | 525/57 |
| 5,400,126 | 3/1995 | Cahill et al. | 355/278 |
| 5,460,874 | 10/1995 | Rao | 428/195 |
| 5,472,789 | 12/1995 | Iqbal et al. | 428/483 |
| 5,483,321 | 1/1996 | Cahill et al. | 355/200 |
| 5,527,615 | 6/1996 | Kimura et al. | 428/422 |
| 5,614,345 | 3/1997 | Gumbiowski | 430/104 |

FOREIGN PATENT DOCUMENTS

| | | | |
|---|---|---|---|
| 0 466 503 A1 | 1/1992 | European Pat. Off. | G03G 7/00 |
| 0 524 635 A1 | 1/1993 | European Pat. Off. | B41M 5/00 |
| 0 683 057 A1 | 11/1995 | European Pat. Off. | B41M 5/00 |
| 0 684 337 A2 | 11/1995 | European Pat. Off. | D06P 5/00 |
| WO 94/20304 | 1/1994 | WIPO . | |
| WO 94/20305 | 3/1994 | WIPO . | |
| WO 94/20306 | 3/1994 | WIPO . | |

OTHER PUBLICATIONS

Progelhof & Thorne: "Polymer Engineering Principles"; *Hanser/Gardner Publications, Inc.*, pp. 405–431.
Bynel Adhesive Polymers: "The Growing Family of Bynel Adhesive Polymers for Industrial Applications", *Dupont Product Literature*, 3 pages.
Bynel CXA Series 1100; *Dupont Product Literature*, 3 pages.
Bynel CXA Series 3100; *Dupont Product Literature*, 3 pages.
Bynel Selector Guide; "The Growing Bynel Family Coextrudable Adhesive Resins: More Ways to Help Your Packaging Ideas Take Shape"; *Dupont Product Literature*, 6 pages.
"Does the Ideal Film for Converting and Labelling Exist"; *Final Labelling News*, 1994, nr2., 3 pages.
"Extrusion"; vol. 6, pp. 608–613.

*Primary Examiner*—John Goodrow
*Attorney, Agent, or Firm*—Gary L. Griswold; Walter N. Kirn; John H. Hornickel

[57] ABSTRACT

An image receptor medium including an image reception layer having two major opposing surfaces. The image reception layer comprises an acid- or acid/acrylate-modified ethylene vinyl acetate (EVA) resin. Alternatively, the image receptor medium includes a substrate layer comprising a polymer substrate layer having two major opposing surfaces and an image reception layer on a first major surface of the substrate layer. The image reception layer has an outer surface for receiving images, and comprises an acid- or acid/acrylate-modified ethylene vinyl acetate (EVA) resin. Either embodiment of the image receptor medium may further include an optional prime layer, an optional adhesive layer, and an optional inkjet layer.

20 Claims, 1 Drawing Sheet

IMAGE RECEPTOR MEDIUM

FIELD OF INVENTION

This invention relates to films useful as image receptor media for a variety of imaging materials such as inks and toners.

BACKGROUND OF THE INVENTION

Advertising and promotional displays often include graphic images appearing on structural surfaces such as truck sides and awnings, or free-hanging as banners. To prepare the display, an image may be formed on an adhesive-backed image receptor medium, sometimes referred to as a graphic marking film, which is then adhered to the desired substrate. Alternatively, the image may be formed first on a temporary carrier, or image transfer medium, and transferred to the image receptor medium. The image receptor medium usually includes a base material with an additional receptor layer overlying it. The base material is typically a plasticized vinyl film, although paper may also be used.

Although the graphic display may be intended for a long term installation of 5 years or more, it is often a relatively short term (3 months to 1 year) outdoor installation. In the case of a short term display, the image receptor medium is desirably a low cost, weather resistant, durable graphic marking film having good printability and adhesion of inks and/or toners that is easily applied to and removed from a surface. The vinyl base films currently used in graphic marking films are generally too costly for a short term application, and present problems with plasticizer migration, plasticizer staining and adhesive anchorage. In addition, the chemical nature of the vinyl may present problems. For instance, the chlorinated composition of vinyl may lead to environmental difficulties related to vinyl disposal and use in applications having a risk of fire, due to hazardous decomposition products, and the cadmium found in stabilizers used in most vinyl formulations is restricted or prohibited in many countries. Paper-based media are not sufficiently durable or weather resistant and tear easily when removed. Polyolefin base films are low cost and contain no plasticizer but do not provide good ink/toner adhesion. The application of the receptor layer over the base film usually requires an additional process step, thus adding cost to the manufacturing process.

Images can be created by one of several known methods, such as electrography, screen printing, ink jet printing, and thermal mass transfer. Electrography involves passing a substrate, normally a dielectric material, through an electrographic printing device, one type of which is an electrostatic printer. In the printer, the substrate is addressed with static electric charges (e.g., as from a stylus) to form a latent image which is then developed with suitable toners. This technique is especially suitable for producing large scale images for use on posters and signs.

At the conclusion of the electrographic process where the toned image has been developed on the dielectric substrate, the printed substrate can be enclosed between two layers of clear vinyl plastic film and used directly in an outdoor application, such as a sign. Because the typical dielectric substrates are paper-based, however, they frequently lack the weather resistance required for outdoor signs. More durable substrates such as polyvinylchloride (PVC) and polyvinylacetate (PVA) films are difficult to image directly because of their electrical and mechanical properties.

To produce large signs that are suitable for outdoor display, the toned image electrographically deposited on a dielectric substrate can be transferred to a more weather resistant image receptor medium. The dielectric substrate is then known as an image transfer medium. This technique is discussed in U.S. Pat. No. 5,262,259. Image transfer may also be practiced with images created by a variety of other known techniques such as knife coating, roll coating, rotogravure coating, screen printing, and the like.

Transfer of the image from an image transfer medium to an image receptor medium typically requires the application of pressure and heat through, for example, lamination in a heated pressure roll system (hot roll lamination). This type of image transfer system is described in U.S. Pat. No. 5,114,520. Though the hot roll lamination system is effective, the transfer rates have been considered slow (generally between 0.5 and 1.0 meters per minute).

Images may also be created directly on a weatherable, durable image receptor medium using such techniques as screen printing and inkjet printing.

The inkjet printing process is now well known. Recently, wide format printers have become commercially available, making feasible the printing of large format articles such as posters, signs and banners. Inkjet printers are relatively inexpensive as compared with many other hardcopy output devices, such as electrostatic printers. Generally, inkjet inks are wholly or partially water-based. Inkjet images may be printed on plain paper or on a suitable image receptor medium that has been treated or coated to improve its inkjet receptor properties. For example, it is known to apply an additional layer of material to an image receptor medium to improve the receptivity to and adhesion of inkjet inks. The materials commonly found in such an inkjet reception layer do not generally adhere well to many image receptor media base films, such as vinyl or polyester.

Print shops or graphic arts facilities that operate more than one type of printing process must stock a different image receptor medium for each process. Because of this, the inventory of receptor media can be large and expensive.

SUMMARY OF THE INVENTION

There is a need for a low-cost, durable, weather resistant image receptor medium that can be used with a variety of inks and toners and will accept a transferred image via hot roll lamination at rates faster than what is currently possible.

The present invention solves the problems in the art with a film for use as an image receptor medium with a variety of printing and image transfer processes, and a variety of imaging materials such as inks and toners. The image receptor medium accepts toned images from an electrographically-printed image transfer medium using hot roll lamination at faster transfer rates than current media and can be made of lower-cost materials. In one aspect, the image receptor medium includes an image reception layer having two major opposing surfaces. The image reception layer comprises an acid- or acid/acrylate-modified ethylene vinyl acetate (EVA) resin. The image reception layer provides properties of image receptivity to the image receptor medium. "Image receptivity" means that an image formed on or applied to the image receptor medium adheres completely or nearly completely after being subjected to a tape snap test in which 3M SCOTCH™ Tape No. 610 (commercially available from 3M Company, St. Paul, Minn., USA) is firmly applied to the image and then removed with a rapid jerking motion. A prime layer is optionally included on a first major surface of the image reception layer. In this case, the second major surface of the image reception layer is an outer surface for receiving images.

In another aspect, the image receptor medium includes a polymer substrate layer having two major surfaces and an image reception layer on one major surface of the substrate layer. The image reception layer comprises an acid- or acid/acrylate-modified ethylene vinyl acetate (EVA) resin for image receptivity as described above and has an outer surface for receiving images. The image reception layer preferably comprises at least 60% by weight of the modified EVA resin.

The image receptor medium can further include an optional prime layer on the major surface of the substrate layer opposite the image reception layer for promoting a strong bond between the substrate layer and an optional adhesive layer. The adhesive layer, preferably comprising a pressure sensitive adhesive, makes the multilayered film useful as a graphic marking film. The prime layer may also by itself serve as an adhesive layer. The image receptor medium can also further include an optional inkjet layer overlying the outer surface of the image reception layer for promoting the primability and receptivity of inkjet inks on the image receptor medium. The inkjet layer preferably comprises at least one top coat layer of one composition and at least one bottom coat layer of a second composition. The bottom coat layer contains dispersed particles of a size that causes protrusions from the surface of the top coat layer.

In the case where the image receptor medium includes a substrate layer, the image receptor medium can advantageously combine the best properties of several resins in the various layers while minimizing the use of the most expensive resins, leading to a higher value and lower cost image receptor medium. For example, the substrate layer is made with resins of generality low cost that can be chosen to provide specifically desired physical properties to the multilayered film. These properties may include dimensional stability, tear resistance, conformability, elastomeric properties, die cuttability, stiffness and heat resistance.

Faster thermal image transfer via hot roll lamination is also possible with the image receptor medium of this invention than with current image receptor media, leading to increased productivity in the printing process. The image receptor medium can be made with relatively simple and inexpensive manufacturing techniques, such as coextrusion or roll coating.

The image receptor medium can be made of only nonhalogenated polymers, meaning that certain regulatory limitations are avoided in the disposal of waste materials (pertaining for example to polyvinyl chloride (PVC)). The image receptor medium exhibits image receptivity with a wide variety of printing materials such as screenprint inks, electrographic liquid and dry toners, thermal mass transfer materials, and inkjet inks (if the optional inkjet layer is present).

The image receptor medium need not contain plasticizers in any of its layers, thereby avoiding problems associated with plasticizer migration and plasticizer staining. The image receptor medium is especially useful as a graphic marking film or banner film for relatively short-term advertising and promotional displays, both indoors and outdoors.

In another aspect, the invention provides a method of making an image receptor medium that involves providing at least two charges, each charge comprising at least one film-forming resin; coextruding the charges to form a multilayered coextrudate, wherein each layer of said coextrudate corresponds to one of the charges; and biaxially stretching the coextrudate to form a multilayered film comprising a nonplasticized polymer substrate layer having two opposing major surfaces; and an image reception layer on a first major surface of the substrate layer. The image reception layer has an outer surface for image reception and comprises an acid- or acid/acrylate-modified ethylene vinyl acetate (EVA) resin as described above.

In another aspect, the invention provides several methods of providing an image on an image receptor medium. In all of the methods, the image receptor medium includes a nonplasticized substrate layer and an image reception layer comprising an acid- or acid/acrylate-modified ethylene vinyl acetate (EVA) resin as described previously. A first method involves forming an image on an image transfer medium via electrography and transferring the image on to the image receptor medium. Other methods involve screen printing the image on the image receptor medium, thermal inkjet printing the image on the image receptor medium (wherein the image receptor medium also includes an inkjet layer as described above), and forming the image by thermal mass transfer on the image receptor medium. Embodiments of the invention are described in connection with the following drawings.

EMBODIMENTS OF THE INVENTION

Figure 1:
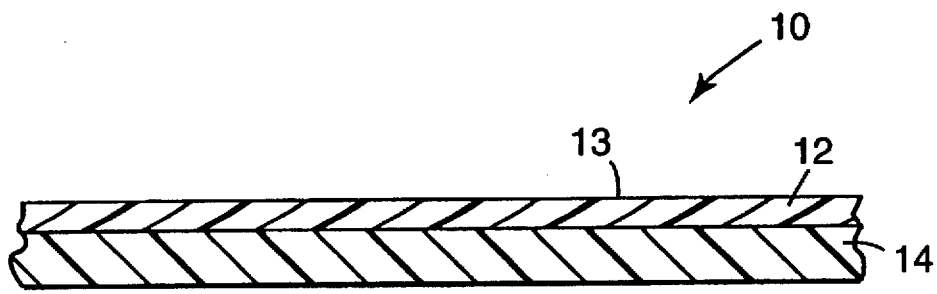
FIG. 1 is a schematic cross-sectional view illustrating an embodiment of the image receptor medium of this invention including an image reception layer and a substrate layer.

In one embodiment, the image receptor medium of this invention comprises a single image reception layer having two major surfaces. In another embodiment, as shown in FIG. 1, the image receptor medium 10 comprises a substrate layer 14 having two major surfaces and an image reception layer 12 overlying and in contact with one surface of the substrate layer as illustrated in FIG. 1. Image reception layer 12 has an outer surface 13 for receiving images.

Image Reception Layer

Image reception layer 12 comprises an acid- or acid/acrylate-modified ethylene vinyl acetate (EVA) polymeric resin. This class of materials includes EVA resins blended with polymers having a sufficient amount of acid or acid/acrylate functionality to provide an adequate amount of image receptivity as previously defined for the desired application. A particularly preferred group of such resins is the BYNEL CXA series 3000 acid/acrylate-modified EVA resins, commercially available from E.I. Du Pont de Nemours and Co. ("Du Pont"). The added chemical functionality of these BYNEL resins contributes to their excellent printability and ink adhesion characteristics.

These resins are typically used in coextrusion processes as relatively thin adhesive tie layers sandwiched between thicker functional layers. The quantity of modified EVA resin in the image reception layer is preferably maximized within the limits of performance requirements of the image receptor medium. Routine efforts could be needed to optimize this quantity, although a typical formulation for most embodiments of the invention includes at least 60%, and preferably about 70% by weight of the modified EVA resin.

The optimum quantity will depend upon the desired application and the targeted cost for the image receptor medium. The performance of the modified EVA resin may be affected by other additives in the image reception layer.

The modified EVA resin in the image reception layer provides image receptivity to a wide variety of imaging materials used in electrography, screen printing, thermal mass transfer or other printing processes. The modified EVA resin is preferably capable of being extruded or coextruded into a substantially two-dimensional sheet and bonding without delamination to an adjacent substrate layer when the layers are coextruded or laminated. Alternatively, the modified EVA resin may be in the form of a dispersion capable of being coated onto a substrate layer by a method such as roll coating.

In the case where an image is transferred to the image receptor medium having both an image reception layer and a substrate layer from an image transfer medium by a method such as hot roll lamination, the image reception layer preferably remains fully attached to the substrate layer and shows minimal tendency to adhere to non-imaged portions of the image transfer medium.

The image reception layer may also contain other components such as pigments, fillers, ultraviolet (UV) absorbing agents, antiblocking agents, antistatic agents, and carrier resins for additives such as pigments, all of which are familiar to those skilled in the art. These additives are preferably chosen so as not to interfere with image receptivity.

If image reception layer 12 is used with a substrate layer 14, image reception layer 12 is relatively thin as compared to substrate layer 14, and preferably has a thickness in the range from 2.5 to 127 microns (0.1 to 5 mils). If image reception layer 12 is not associated with a substrate layer 14, then image reception layer 12 may need to be thicker than the above-described range to provide sufficient durability and dimensional stability for the intended application. A thicker image reception layer can increase the overall cost of the image receptor medium.

Optional Substrate Layer

In one embodiment, a substrate layer 14 is included in the image receptor medium, for example to reduce the cost and/or enhance the physical properties of the medium. The substrate layer is most commonly white and opaque for graphic display applications, but could also be transparent, translucent, or colored opaque. Substrate layer 14 can comprise any polymer having desirable physical properties for the intended application. Properties of flexibility or stiffness, durability, tear resistance, conformability to non-uniform surfaces, die cuttability, weatherability, heat resistance and elasticity are examples. For example, a graphic marking film used in short term outdoor promotional displays typically can withstand outdoor conditions for a period in the range from about 3 months to about one year or more and exhibits tear resistance and durability for easy application and removal.

The material for the substrate layer is preferably a resin capable of being extruded or coextruded into a substantially two-dimensional film. Examples of suitable materials include polyester, polyolefin, polyamide, polycarbonate, polyurethane, polystyrene, acrylic, and polyvinyl chloride. Preferably, the substrate layer comprises a nonplasticized polymer to avoid difficulties with plasticizer migration and staining in the image receptor medium. Most preferably, the substrate layer comprises a polyolefin that is a propylene-ethylene copolymer containing about 6 weight % ethylene.

The substrate layer may also contain other components such as pigments, fillers, ultraviolet absorbing agents, slip agents, antiblock agents, antistatic agents, and processing aids familiar to those skilled in the art. The substrate layer is commonly white opaque, but may also be transparent, colored opaque, or translucent.

A typical thickness of the substrate layer 14 is in the range from 12.7 to 254 microns (0.5 mil to 10 mils). However, the thickness can be outside this range providing the resulting image receptor medium is not too thick to feed into the printer or image transfer device of choice. A useful thickness is generally determined based on the requirements of the desired application.

Optional Prime Layer

Figure 2:
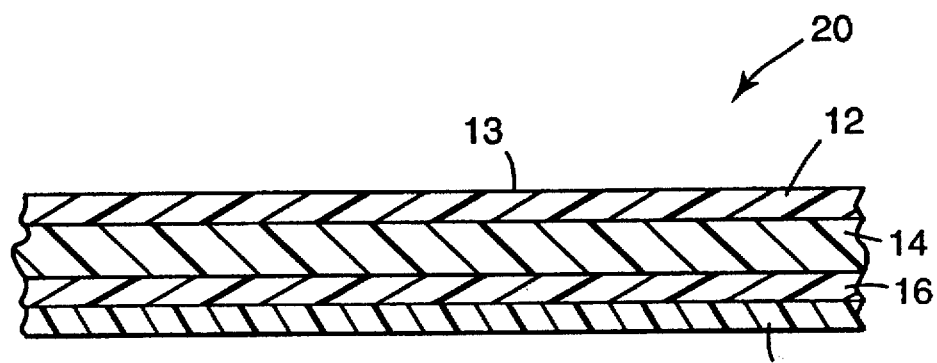
FIG. 2 is a schematic cross-sectional view illustrating the image receptor medium of this invention including the layers shown in FIG. 1 and an optional prime layer.

As illustrated in FIG. 2, optional prime layer 16 is located on the surface of substrate layer 14 opposite image reception layer 12. In the case where the image receptor medium does not include a substrate layer (not shown), the prime layer is located on the surface of the image reception layer 12 opposite the outer surface 13. The prime layer serves to increase the bond strength between the substrate layer and an adhesive layer 17 if the bond strength is not sufficiently high without the prime layer. The presence of an adhesive layer makes the image receptor medium useful as a graphic marking film. Although it is preferable to use a pressure sensitive adhesive, any adhesive that is particularly suited to the substrate layer and to the selected application can be used. Such adhesives are those known in the art and may include aggressively tacky adhesives, pressure sensitive adhesives, repositionable or positionable adhesives, hot melt adhesives, and the like.

The adhesive layer 17 is preferably covered with a release liner (not shown) that provides protection to the adhesive until the image receptor medium is ready to be applied to a surface.

Prime layer 16 may also by itself serve as an adhesive layer in some applications. The prime layer preferably comprises an ethylene vinyl acetate resin containing from about 5 weight % to about 28 weight % vinyl acetate, and a filler such as talc to provide a degree of surface roughness to the prime layer. The filler helps prevent blocking and promotes adhesion of the adhesive. The filler is generally present in an amount in the range from about 2% to about 12% by weight, preferably about 4% to about 10% by weight, and more preferably about 8% by weight. The layer may also contain other components such as pigments, fillers, ultraviolet absorbing agents, antiblock agents, antistatic agents, and the like.

Optional Inkjet Layer

Figure 3:
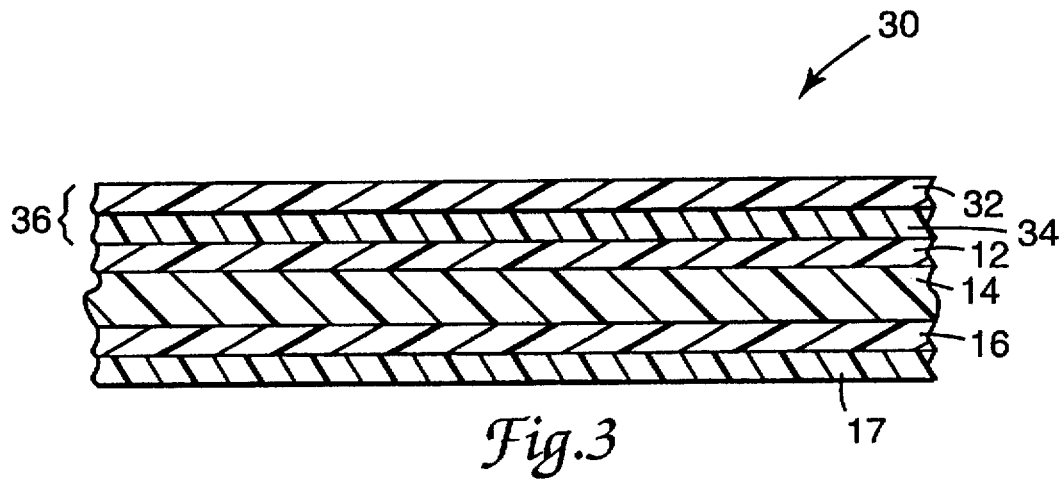
FIG. 3 is a schematic cross-sectional view illustrating the image receptor medium of this invention including the layers shown in FIG. 1, an optional prime layer and an optional inkjet layer.

FIG. 3 illustrates an image receptor medium having the same features as shown in FIG. 2, with the addition of an optional inkjet layer 36 on the outer surface 13 of the image reception layer 12. The inkjet layer is preferably used when the image receptor medium will receive images from a thermal ink jet printer using water-based inkjet inks (either dye-based or pigment-based) to provide characteristics of dye bleed resistance, low fading, uniform fading and rapid drying. In one embodiment, the inkjet layer comprises at least two layers 32 and 34. The uppermost layer 32, or top coat layer, functions as a protective penetrant layer to rapidly take up the water-based ink while the bottom coat layer 34 functions as an inkjet receptor. The bottom coat layer contains dispersed particles of a size such that the surface of the top coat layer exhibits protrusions or is roughened. The dispersed particles are preferably cornstarch or a modified cornstarch. The formulation of such inkjet layers is described in Applicants' copending application, Ser. No. 08/554256, Docket Number 50934USA1C, entitled "Ink Jet Printing Sheet". Alternatively, the inkjet layer may comprise a single layer (not shown) such as described U.S. Pat. Nos. 5,389,723 and 5,472,789.

It is within the spirit of this invention to include other layers in addition to the image reception layer 12, the substrate layer 14, the optional prime layer 16, the optional adhesive layer 17, and the optional inkjet layer 36. Additional layers may be useful for adding color, enhancing dimensional stability, promoting adhesion between dissimilar polymers in the above-described layers, and the like. After the image receptor medium has been printed with an image, an optional protective overlaminate layer (not shown) may be adhered to the printed surface. The overlaminate layer improves weather resistance of the film by helping to protect the film from ambient humidity, direct sunlight and other weathering effects, as well as protecting the image from nicks, scratches, and splashes. In addition, the overlaminate layer can impart a desired finish to the image, such as high gloss or matte. Suitable overlaminate layers include any suitable transparent plastic sheet material bearing an adhesive on one surface. Use of such overlaminate layers is, for example, described in U.S. Pat. No. 4,966,804, incorporated by reference herein.

Making the Image Receptor Medium

The image receptor medium of this invention can be made by a number of methods. For example, layers 12 and optional layers 14 and 16 can be coextruded using any suitable type of coextrusion die and any suitable method of film making such as blown film extrusion or cast film extrusion. Adhesive layer 17 may be coextruded with the other layers, transferred to the image receptor medium from a liner, or directly coated onto the image receptor medium in an additional process step. For the best performance in coextrusion, the polymeric materials for each layer are chosen to have similar properties such as melt viscosity. Techniques of coextrusion are found in many polymer processing references, including Progelhof, R. C., and Throne, J. L., "Polymer Engineering Principles", Hanser/Gardner Publications, Inc., Cincinnati, Ohio, 1993. Alternatively, one or more of the layers may be extruded as a separate sheet and laminated together to form the image receptor medium. One or more of the layers may also be formed by coating an aqueous or solvent-based dispersion onto one or more previously extruded layers. This method is less desirable because of the extra process steps and the additional waste involved.

The finished image receptor medium may be subjected to a surface treatment method such as corona treatment to improve the image receptivity of the image receptor medium for certain applications.

Use of the Image Receptor Medium

The imaging materials that can be used in accordance with the present invention are particulate and semicrystalline or amorphous materials comprising a film-forming or resinous binder that is generally a thermoplastic. The imaging materials also contain pigments or dyes to provide contrast or color to the deposited image. Inks and toners are examples of well known imaging materials. The imaging materials may be deposited by a variety of known techniques such as electrography, screen printing, knife or roll coating, rotogravure coating, and the like.

An example of an imaging process using the image receptor medium of the present invention comprises first generating a toned image on an image transfer medium in an electrostatic printer using techniques and materials such as those described in U.S. Pat. No. 5,262,259, the disclosure of which is incorporated by reference, and then transferring the image to the image receiving surface of the image receptor medium. The image transfer can be accomplished in many ways known in the art such as passing the sheets together through heated nip rolls in a method known as hot roll lamination, or placing the sheets together on a heated platen in a vacuum drawdown frame. Hot roll lamination is described in U.S. Pat. No. 5,144,520, the disclosure of which is incorporated by reference. The imaged medium is then preferably covered with an overlaminate layer. If the multilayered film includes an adhesive layer and a release liner, the release liner may be removed and the imaged medium affixed to a wall, vehicle side, banner, or other surface using techniques well known in the art.

In another example of an imaging process, the image receptor medium is screen printed directly, thereby receiving the desired image without the extra image transfer step. The techniques and materials for practicing screen printing are described in U.S. Pat. No. 4,737,224, the disclosure of which is incorporated by reference herein. The imaged film is then used as described above.

In another example of an imaging process, the image receptor medium is fed into an inkjet printer, printed directly with the desired image, and then overlaminated and applied as described above.

In another example of an imaging process, the image receptor medium is printed directly with an image via a thermal mass transfer process, using a device such as a GERBER EDGE thermal transfer printer (Gerber Scientific Products, Inc., Manchester, Conn., USA). The image film is then used as described above.

The invention is further illustrated by the following examples, but the particular materials and amounts thereof recited in these examples, as well as other conditions and details, should not be construed to unduly limit this invention.

EXAMPLE 1

Four samples of image receptor media each comprising a substrate layer and an image reception layer according to this invention were made as follows: For each of two samples, film was produced using a cast extrusion process. Resin pellets were fed to a 4.45 cm (1.75 in) Prodex single screw extruder with a temperature profile from 171° C. (340° F.) to 232° C. (450° F.) with a melt temperature of 207° C. (405° F.). A drop die was used to cast the extrudate onto a polyethylene terephthalate (PET) base film approximately 30 cm (12 inches) wide and 0.05 mm (0.002 in) thick. The resulting film construction was run between a steel chill roll and a rubber backup roll to solidify the molten resin into a layer having a thickness of approximately 0.05 mm (0.002 in). Sample 1A made by this method contained BYNEL CXA 3101 acid/acrylate-modified EVA resin from dupont with no further additives, while Sample 1B contained only BYNEL CXA 1123 acid-modified EVA resin, also from Du Pont. Both samples were corona treated using a handheld corona treating device Model #BD-20C manufactured by Electro-Technic Products, Inc, Chicago, Ill., 60640.

The final two samples (samples 1C and 1D), along with a comparative film sample (sample C-1), were made using a conventional blown film coextrusion process. Each of three extruders A, B, and C supplied a melt formulation to an annular die where the melts were combined to form a single molten stream consisting of three distinct layers in a sleeve shape. For each sample, the melt of extruder A formed the image reception layer, the melt of extruder B formed the substrate layer, and the melt of extruder C formed the prime layer. For comparative sample C-1, each layer comprised only LLDPE or a combination of LDPE and LLDPE as the polymeric components. The molten polymer sleeve was then blown to its final diameter and thickness by introducing air into the sleeve and trapping it between the die and nip rolls at the top of the blown film tower. The film sleeve was then slit into two flat film webs, each of which was corona treated on the image reception layer side and wound onto a core. The resulting samples each had a thickness of about 0.1 mm (0.004 in), although layer thickness distribution varied. The layer formulations and thicknesses are shown in the tables below.

| | Layer Formulations | | |
|---|---|---|---|
| Ingredient | Sample 1C [parts by weight] | Sample 1D [parts by weight] | Sample C-1 [parts by weight] |
| Image reception layer | | | |
| ELVAX 3135 ethylene vinyl acetate (EVA) resin (Du Pont) | 100 | — | — |
| BYNEL CXA 3101 acid/acrylate modified EVA resin (Du Pont) | — | 100 | — |
| AMPACET 11976 TiO$_2$ color concentrate (Ampacet Corp., Tarrytown, NJ) | 20 | 20 | 25 |
| POLYFIL MT5000 talc concentrate (Polyfil Corp., Dover, NJ) | 20 | 5 | 10 |
| AMPACET 10407 UV inhibitor concentrate (Ampacet Corp., Tarrytown, NJ) | 5 | 5 | 5 |
| ESCORENE 108.37 low density polyethylene resin (Exxon Chemical Co.) | — | — | 60 |
| 6109T linear low density polyethylene resin (Chevron Chemical Co.) | — | — | 40 |
| Substrate layer | | | |
| DOWLEX 2256A linear low density polyethylene resin (Dow Chemical, Midland, MI) | 100 | 100 | — |
| 6109T linear low density polyethylene resin (Chevron Chemical Co.) | — | — | 100 |
| AMPACET 11976 TiO$_2$ color concentrate (Ampacet Corp., Tarrytown, NJ) | 30 | 30 | — |
| AMPACET 10407 UV inhibitor concentrate (Ampacet Corp., Tarrytown, NJ) | 5 | 5 | 5 |
| AMPACET 19270 black color concentrate (Ampacet Corp., Tarrytown, NJ) | — | — | 1 |
| Prime layer | | | |
| ELVAX 3135B ethylenevinyl acetate (EVA) resin (Du Pont) | 100 | 100 | — |
| ESCORENE 108.37 low density polyethylene resin (Exxon Chemical Co.) | — | — | 60 |
| 6109T linear low density polyethylene resin (Chevron Chemical Co.) | — | — | 40 |
| POLYFIL MT5000 talc concentrate (Polyfil Corp., Dover, NJ) | 20 | 20 | 10 |
| AMPACET 10407 UV inhibitor concentrate (Ampacet Corp., Tarrytown, NJ) | 5 | 5 | 5 |
| AMPACET 19270 black color concentrate (Ampacet Corp., Tarrytown, NJ) | 5 | 3 | — |
| AMPACET 11976 TiO$_2$ color concentrate (Ampacet Corp., Tarrytown, NJ) | — | — | 25 |

| | Layer Thicknesses | | |
|---|---|---|---|
| Layer | Sample 1C [% of total film thickness] | Sample 1D [% of total film thickness] | Sample C-1 [% of total film thickness] |
| Image reception layer | 40 | 40 | 30 |
| Substrate layer | 45 | 45 | 40 |
| Prime layer | 15 | 15 | 30 |

All of the samples were tested for ink adhesion using 3M SCOTCHCAL™ 3905 and 3M SCOTCHCAL™ 66051 screenprint inks. The inks were applied to each film sample on the image reception layer side using conventional screenprint methods utilizing a 230 mesh screen with an "ABC" test pattern. The printed samples were dried in an oven for four hours at 66° C. (150° F.). Each sample was also screen printed with 3M SCOTCHCAL 9705 UV curing ink using a 390 mesh screen. The printed samples were cured in a focus cure unit using a UV dosage of 158 millijoules per square centimeter (mJ/cm$^2$) as measured in the UVA spectral region by a UVICURE PLUS radiometer manufactured by EIT, Inc., Sterling, Va. All of the printed samples were then evaluated using a crosshatch adhesion test as follows. Each sample was scribed with ten parallel lines spaced about 1.6 mm (1/16 in) apart using the corner of a sharp razor blade. The scribed lines cut through the ink layer only and not the base film. Another set of similar lines was scribed through the ink at right angles to the first set resulting in a crosshatch pattern. A 2.5 cm×10.2 cm (1 in×4 in) piece of 3M SCOTCH™ tape No. 610 was then applied over the crosshatch pattern and wiped with two firm application strokes using a 3M PA-1 applicator squeegee. The tape was pulled off using a sharp jerk and the crosshatched sample was observed for ink removal. The samples were rated as "poor", "fair", "good" or "excellent" according to visual standards. Results are shown in the table below. As expected, comparative sample C-1 containing only LDPE and LLDPE as the polymeric components in the image reception layer exhibited poor ink adhesion.

The samples were then evaluated for image transfer quality. To accomplish this a multicolored weather bar graphic was imaged on SCOTCHPRINT™ 8601 transfer media available from 3M in a SCOTCHPRINT™ 9512 electrostatic printer. The toned image on the transfer medium was then placed in contact with the image reception layer of the multilayered film and the two sheets were passed through a Pro-Tech Model EGS-692 hot roll laminator set at 96° C. (205° F.) and 441 kPa (64 psi). For each sample, the transfer rate was gradually increased until transfer quality became poor. The quality of the transferred image was visually rated as "poor", "fair", "good", or "excellent". Results are found in the table below.

| Sample | Series 3900 ink adhesion | Series 66001 ink adhesion | Series 9700 ink adhesion | Image transfer quality | Maximum acceptable image transfer rate [m/min (fpm)] |
|---|---|---|---|---|---|
| 1A | Good | Good | Good | Good | 3.7 (12) |
| 1B | Good | Good | Good | Good | 3.7 (12) |
| 1C | Poor | Good | Good | Good | 2.6 (8.5) |
| 1D | Good | Good | Good | Good | 3.1 (10) |
| C-1 | Poor | Poor | Poor | Fair–Good | 0.5 (1.5) |

Comparative sample C-1 only exhibited acceptable image transfer quality at very low rates of transfer. It is important to note that Sample 1D which contained not only BYNEL CXA 3101 modified EVA resin but about 13% by weight of LDPE in the form of carrier resin provided good ink adhesion and image transfer quality. This result is somewhat surprising because both LDPE and LLDPE (exemplified by Sample C-1) are poor ink receptors.

Sample 1D was then further tested for weatherability as follows. Sample 1D film was laminated to a commercially available release liner having an acrylic adhesive layer on one side. The film was laminated such that the side opposite the image reception layer was in contact with the adhesive of the release liner. Two printed samples were then produced using the laminated film and designated 1D-1 and 1D-2. Sample 1D-1 was screen printed with 3M SCOTCHCAL™ 3905 black ink using a 230 mesh screen having an "ABC" lettering test pattern and air dried for one hour. The entire sample surface was then printed with 3M SCOTCHCAL™ 3920 clear ink using a 230 mesh screen and dried for four hours in a forced air oven at 66° C. (150° F.). Sample 1D-2 was screen printed with 3M SCOTCHCAL™ 9705 UV curing screenprint ink using a 390 mesh screen having the same test pattern used for sample 1D-1. The ink was cured with a UV dose of 153 millijoules per square centimeter (mJ/cm$^2$). The entire surface of the cured sample was then printed with 3M SCOTCHCAL™ 9720 clear ink and cured with a UV dose of 246 mJ/cm$^2$. The resultant printed samples 1D-1 and 1D-2 were cut into 6.4 cm×8.9 cm (2.5 in×3.5 in) pieces. The release liner was peeled from each of the pieces and they were applied to an aluminum panel and placed into a xenon lamp weathering device (Atlas Model 65XWWR). The samples were then exposed using ASTM G-26 Type B test conditions. After 3000 hours of exposure the test samples had very little color shift and were still flexible enough to be peeled from the test panel in one piece. These results are considered indicators of success for outdoor display applications.

EXAMPLE 2

Twelve image receptor media were evaluated for image transfer quality. The media were polymer films between 25 and 254 microns thick. Each of the films was made by standard extrusion methods and comprised a single image reception layer. Evaluated for comparison were a film of LDPE and a commercially available image receptor medium (SCOTCHPRINT™ CONTROLTAC™ marking film 8620 from 3M). Images were generated on SCOTCHPRINT™ 8601 transfer media in a SCOTCHPRINT™ 9512 electrostatic printer using standard SCOTCHPRINT™ toners. All of these products are commercially available from 3M. A toned image was then transferred to each film sample using a Pro-Tech Model EGS-692 hot roll laminator set at 96° C. (205° F.) and 441 kPa (64 psi). Transfers were run at rates of 0.6 and 3.1 meters per minute (m/min) (2 and 10 feet per minute (fpm)).

The samples were evaluated for image transfer quality at both low and high transfer speeds using a visual standard method rating system (VSM). This method involves inspection of the transfer medium after transfer for remaining toner and inspection of the receptor medium for transfer image quality, uniformity of color and presence of defects. A minimum rating of 8.5 is required for acceptable transfer, while a rating of 10.0 is considered perfect toner transfer. The lowest rating is 4.0. The polymer films and corresponding results are summarized in the table below:

| Sample | Polymer film | Image transfer quality [VSM] at transfer speeds | |
|---|---|---|---|
| | | 0.6 m/min (2 fpm) | 3.1 m/min (10 fpm) |
| 2A | Extruded film containing ELVAX 3124-2 ethylene vinyl acetate resin (EVA) (E.I. Du Point de Nemours & Co) | 10.0 | 8.5 |
| 2B | Extruded film containing ELVAX 4260 EVA resin (Du Pont) | 10.0 | 9.0 |
| 2C | Extruded film containing ELVAX 4355 EVA resin (Du Point) | 10.0 | 8.5 |
| 2D | Extruded film containing BYNEL 1123 acid modified EVA resin (Du Pont) | 10.0 | 9.0 |
| 2E | Extruded film containing BYNEL CXA 3101 acid/acrylate modified EVA resin (Du Pont) | 10.0 | 9.0 |
| 2F | Extruded film containing BYNEL 2002 acid-modified ethylene acrylate resin (Du Pont) | 10.0 | 9.0 |
| 2G | Hot melt pressed film containing DPDA 9169 ethylene ethyl acrylate copolymer (EEA) (Union Carbide Chemicals and Plastics Co. Inc.) | 10.0 | 7.5 |
| 2H | Extruded film containing TC-120 ethylene methyl acrylate resin (EMA) (Exxon Chemical Corp.) | 10.0 | 9.0 |
| 2I | Extruded 51 micron (2 mil) thick film containing Primacor 3440 ethylene acrylic acid resin (EAA)(Dow Chemical); also an ultraviolet radiation stabilizer package including a pair of ultraviolet radiation absorbers, a hindered amine light stabilizer and an antioxidant. | 10.0 | 7.5 |
| 2J | Extruded 102 micron (4 mil) thick film containing SURLYN 1705-1 EMA copolymer ionomer resin (Du Pout) and 12% by weight $TiO_2$; also an ultraviolet radiation stabilizer package including a pair of ultraviolet radiation absorbers, a hindered amine light stabilizer and an antioxidant. | 10.0 | 7.0 |
| 2K | Extruded film containing SURLYN 1705-1 EMA copolymer ionomer resin (Du Pont); also an ultraviolet radiation stabilizer package including a pair of ultraviolet radiation absorbers, a hindered amine light stabilizer and an antioxidant. | 10.0 | 4.0 |
| 2L | Hot melt pressed film containing BOSTIK-4189 polyester resin (Bostik, Inc.) | 10.0 | 9.5 |
| C-2 | SCOTCHPRINT ™ - CONTROLTAC ™ marking film 8620 (3M) | 9.5 | <4.0 |
| C-3 | Extruded film containing low density polyethylene resin (LDPE); $TiO_2$-based color concentrate | <4.0 | <4.0 |

All of the samples exhibited excellent transfer quality at 0.6 m/min, except comparison sample C-3 (LDPE). All samples except sample 2K showed significantly better transfer quality than comparison samples C-2 and C-3 at 3.1 m/min.

EXAMPLE 3

Two image receptor media were evaluated for image transfer quality with respect to lamination temperature, lamination pressure, transfer speed and image transfer media. The first medium was Sample 1D film described in Example 1. The image reception layer comprised BYNEL CXA 3101 acid/acrylate modified EVA resin from Du Pont and a titanium dioxide ($TiO_2$)-based white color concentrate containing 50% LDPE as a carrier resin to make the layer appear white. The prime layer comprised ELVAX 3135B EVA resin from Du Pont and a black color concentrate to make the layer appear black.

A second film was made by extruding a 102 micron (4 mil) thick layer comprising SURLYN 1705 ethylene acid copolymer ionomer resin from Du Pont. The film was pigmented white with about 20% by weight of a $TiO_2$-based color concentrate containing 8.55% by weight LDPE and contained an ultraviolet radiation stabilizer package similar to that recommended by the resin manufacturer and comprising a pair of ultraviolet radiation absorbers, a hindered amine light stabilizer, and an antioxidant. The film was corona discharge treated on one side. A 25.3 μm (1 mil) thick acrylic pressure sensitive adhesive layer was laminated to the corona treated surface using a pair of heated nip rolls, and a release liner was added to protect the adhesive layer. This film was designated as sample 3A.

Weather bar graphic images were formed in the same manner as described in Example 1 on SCOTCHPRINT™ 8601 and SCOTCHPRINT™ 8603 transfer media, both available from 3M. The images were transferred to samples 1D and 3A, along with a comparison sample of 3M SCOTCHPRINT™ CONTROLTAC™ marking film 8620, using a hot roll laminator at combinations of high and low lamination temperatures (96° C. and 88° C.), high and low lamination pressures (441 kPa and 276 kPa) and high and low transfer speeds (1.5 m/min and 0.5 m/min). Image transfer quality was evaluated using the visual standard method rating system (VSM) of Example 2. Results are summarized in the table below.

| Sample | Image Transfer Media | Laminination Temperature [°C. (°F.)] | Lamination Pressure [kPa (psi)] | Transfer Speed [m/min (fpm)] | Transfer Quality [VSM] |
|---|---|---|---|---|---|
| Scotchprint ™ 8620 | Scotchprint ™ 8601 | 96 (205) | 441 (64) | 0.5 (1.5) | 10.0 |
| 3A | Scotchprint ™ 8601 | 96 (205) | 441 (64) | 1.5 (5.0) | 10.0 |
| 1D | Scotchprint ™ 8601 | 96 (205) | 441 (64) | 1.5 (5.0) | 9.5* |
| 1D | Scotchprint ™ 8601 | 96 (205) | 276 (40) | 1.5 (5.0) | 9.0* |
| 1D | Scotchprint ™ 8601 | 88 (190) | 441 (64) | 1.5 (5.0) | 8.5* |
| 1D | Scotchprint ™ 861 | 88 (190) | 276 (40) | 1.5 (5.0) | 6.5* |
| 1D | Scotchprint ™ 8603 | 96 (205) | 441 (64) | 0.5 (1.5) | 10.0 |
| 1D | Scotchprint ™ 8603 | 96 (205) | 441 (64) | 1.5 (5.0) | 7.0 |
| 1D | Scotchprint ™ 8603 | 96 (205) | 276 (40) | 1.5 (5.0) | 6.5 |
| 1D | Scotchprint ™ 8603 | 88 (190) | 441 (64) | 1.5 (5.0) | 7.0 |
| 1D | Scotchprint ™ 8603 | 88 (190) | 276 (40) | 1.5 (5.0) | 6.0 |

*Portions of image reception layer stuck to white, non-imaged areas of image transfer media Both samples 1D and 3A exhibited good transfer quality at the higher transfer speed when SCOTCHPRINT™ 8601 transfer media was used. However, Sample 1D (containing the BYNEL modified EVA resin) stuck to the white non-toned areas of the transfer media. This result was surprising since sample 2E of Example 2 comprising a film of 100% BYNEL modified EVA resin received an image from SCOTCHPRINT™ 8601 transfer media without sticking. It is thought that corona treatment of sample 1D may have caused the sticking.

EXAMPLE 4

An image receptor medium for dye- and pigment-based inkjet inks was prepared by coating the following inkjet layer formulations onto a multilayered film. The film was made using the same techniques and materials as for Sample 1D film of Example 1, except that in the substrate layer formulation, LDPE resin component was replaced with Z9470 propylene-ethylene copolymer resin (Fina Oil and Chemical Corp.) For the inkjet layer, a bottom coat solution was made by thoroughly mixing until homogeneous: 11.66% by weight (of the total mixture) of a 20% aqueous solution of a copolymer as described in EP 0484016 A1, 6.75% by weight of K90 solid poly(vinyl pyrrolidone) (ISP Technologies, Inc.), 2.33% by weight of CARBOWAX C600 polyethylene glycol (Union Carbide Chemicals and Plastics Company, Inc.), 1.56% by weight of a 20% aqueous solution of a mordant with chloride counterions as described in U.S. Pat. No. 5,342,688, and PCT Publications WO 94/20304, WO 94/20305, and WO 94/20306, 23.58% by weight of ethanol and 51.32% by weight of deionized water. To the mixture was added 2.4% by weight of LOK-SIZE 30 cationic cornstarch (A. E. Staley Manufacturing Company). The solution was mixed using an overhead stirrer for four hours, and then homogenized for thirty minutes in a five gallon pail using a Silverson high-speed Multi-Purpose Lab mixer, fitted with a disintegrating head.

Before coating, 0.05% by weight of 30% aqueous ammonia (Aldrich Chemical Company), followed by 0.35% by weight of XAMA 7 aziridine crosslinker (Hoechst Celanese Corporation) were mixed in thoroughly.

The bottom coat solution was coated on the image reception layer side of the multilayered film using a laboratory-scale notchbar coater. The gap setting of the notchbar was set at 0.18 mm (7 mils). The coated sample was placed in an oven set at 82° C. (180° F.) for 5 minutes to provide a dried, crosslinked bottom coat layer.

A top coat solution was made by mixing thoroughly until homogenous: 66% by weight (of the total mixture) deionized water, 0.56% by weight AIRVOL 540 poly(vinyl alcohol) (Air Products), 33% by weight ethanol, 0.21% by weight LOK-SIZE cationic cornstarch (A. E. Staley Manufacturing Company), 0.14% by weight KELTROL TF 1000 xanthan gum (Kelco division of Merck & Co., Inc.), and 0.1% by weight TRITON X-100 nonionic surfactant (Union Carbide Chemicals and Plastics Company, Inc.).

The above solution was overcoated onto the above-described bottom coat layer of the multilayered film using the same notchbar coater with a gap of 0.07 mm (3 mils). The sample was again placed in an oven set at 82° C. (180° F.) for 5 minutes to provide a dried top coat layer.

To evaluate the resulting inkjet layer, color test patterns were printed directly onto the inkjet layer side of the resulting material using the following printer and ink combinations:

A. HP755 DesignJet printer (Hewlett-Packard) with HP 51650 series dye-based ink cartridges (cyan, magenta, yellow) and HP 51640A pigment-based ink cartridge (black) from Hewlett-Packard.

Novajet III printer (Encad Co.) with dye-based inks from American Ink Jet Corp.

C. Novajet III printer (Encad Co.) with pigment-based inks (cyan, magenta, yellow), the formulations of which are described in assignee's copending application Ser. Nos. 08/556336, Attorney's Docket No. 52146USA4A, entitled "Water-Based Pigmented Inks", and 08/608921, Attorney's Docket No. 52356USA9A, entitled "Water-Based Pigmented Inks having Silicone-Containing Polymer Incorporating Therein".

Optical densities were measured on the printed samples without overlaminate using a Gretag SPM-50 densitometer, subtracting the density of the unprinted area of the sample as background. All of the samples were tested for ink adhesion using a tape pull test as follows:

1. A sample was aged for 30 minutes in a controlled environment at 32° C. (90° F.) and 90% R.H. Each sample was removed from the environment and immediately tested.

2. A piece of 3M SCOTCH™ Tape No. 610 was placed on the sample and firmly applied using at least two strokes of a 3M PA-1 applicator squeegee. The piece of tape was positioned so as to contact all of the different color areas as well as some unimaged area on either side of the color bars.

3. The tape was peeled back from the sample with a single rapid jerking motion.

4. The sample was visually inspected for any ink removal from the color areas. If the color areas were completely intact with no ink removal, the test result was recorded "Pass". Any level of removal was recorded as "Fail".

Results are shown in the table below.

| Test setup | Density (C) | Density (M) | Density (Y) | Density (K) | Ink adhesion |
|---|---|---|---|---|---|
| A | 1.52 | 1.47 | 1.37 | 1.77 | Pass |
| B | 2.0 | 2.18 | 1.03 | 2.2 | Pass |
| C | 1.5 | 1.5 | 1.14 | — | Pass |

It should be noted that other multilayered films having high density polyethylene (HDPE) as the primary substrate layer component instead of the propylene-ethylene copolymer were coated with the same inkjet layer formulation described above. These films were unsuccessful in printing evaluations because the films were unable to withstand the high temperatures of the thermal ink jet printing process without distortion. Thus, heat resistance is a factor in the choice of substrate layer for inkjet printing applications.

EXAMPLE 5

An image receptor medium having an image reception layer, a substrate layer, and a prime layer was made using the blown film coextrusion process described in Example 1 for Samples 1C and 1D. The resulting multilayered film had an overall thickness of 102 μm (4 mils), with the image reception layer comprising 15% of the total thickness, the substrate layer 65%, and the prime layer 20%. Layer formulations are shown in the table below.

| Ingredient | parts by weight |
|---|---|
| Image reception layer | |
| BYNEL CXA 3101 acid/acrylate-modified ethylene vinyl acetate (EVA) resin (Du Pont) | 100 |
| AMPACET 11976 TiO₂ color concentrate (Ampacet Corp., Tarrytown, NJ) | 20 |
| POLYFIL MT5000 talc concentrate (Polyfil Corp., Dover, NJ) | 5 |

-continued

| Ingredient | parts by weight |
| --- | --- |
| AMPACET 10407 UV inhibitor concentrate (Ampacet Corp., Tarrytown, NJ) | 5 |
| Substrate layer | |
| Z9470 propylene-ethylene copolymer resin (Fina Oil and Chemical Corp.) | 100 |
| AMPACET 11233 $TiO_2$ color concentrate (Ampacet Corp., Tarrytown, NJ) | 30 |
| AMPACET 10407 UV inhibitor concentrate (Ampacet Corp. Tarrytown, NJ) | 5 |
| Prime layer | |
| ELVAX 3135B ethylene vinyl acetate (EVA) resin (Du Pont) | 100 |
| POLYFIL MT5000 talc concentrate (Polyfil Corp., Dover, NJ) | 20 |
| AMPACET 10407 UV inhibitor concentrate (Ampacet Corp., Tarrytown, NJ) | 5 |
| Plastic Color Chips #520002 gray color concentrate (Plastic Color Chips, Inc., Asheboro, NC) | 2.5 |
| AMPACET 11976 $TiO_2$ color concentrate (Ampacet Corp., Tarrytown, NJ) | 20 |

The resulting multilayered film was laminated to a water-based acrylic pressure sensitive adhesive carried on a silicone coated polyester release liner. The release liner had pre-punched tracking holes for proper feeding through a GERBER EDGE thermal transfer printing machine manufactured by Gerber Scientific Products, Inc., Manchester, Conn. The multilayered film was narrower than the release liner to allow the tracking holes to remain open. The resulting image receptor medium was then passed through the GERBER EDGE printing machine and a test pattern was applied using standard thermal transfer materials. For comparison, the same test pattern was also applied to SCOTCHCAL™ 3636-10B and SCOTCHCAL™ 3636-20B marking films, both available from 3M for use in the thermal mass transfer process. The three images were visually inspected and the image on the image receptor medium of this invention was judged to be at least comparable in quality to the images on the two standard marking films. In addition, the image on image receptor medium of this invention was tested for adhesion using the ink adhesion tape snap test described in Example 1. No image failure was observed.

COMPARATIVE EXAMPLE 6

For comparison to the above examples, samples of commercially available multilayered coextruded adhesive-backed label films were evaluated for ink adhesion and image transfer quality. The samples included FASCLEAR and PRIMAX label films from Avery International Corporation, Pasadena, Calif. Pieces of each film were mounted onto 30 cm×30 cm sheets of 3M SCOTCHCAL™ 180-10 graphic marking film for evaluation.

All of the samples were tested for ink adhesion using 3M SCOTCHCAL™ 3905, 3M SCOTCHCAL™ 66051, and 3M SCOTCHCAL™ 1971 screenprint inks. The inks were applied as a solid block of color to each film sample using conventional screenprint methods with a 230 mesh screen. The printed samples were dried in an oven for four hours at 66° C. (150° F.). Each sample was also screen printed with 3M SCOTCHCAL™ 9705 UV curable screenprint ink using a 390 mesh screen. The printed samples were cured in a focus cure unit providing a UV dosage of 159 mJ/cm™. All of the printed samples were then evaluated using the cross-hatch adhesion test described in Example 1. The percentage of ink removed was estimated and results are shown in the table below.

| Ink | PRIMAX label film [% ink adhesion failure] | FASCLEAR label film [% ink adhesion failure] |
| --- | --- | --- |
| SCOTCHCAL ™ 1971 ink | 100 | 50 |
| SCOTCHCAL ™ 3905 ink | 100 | 100 |
| SCOTCHCAL ™ 6605I ink | 100 | 45 |
| SCOTCHCAL ™ 9705 ink | 100 | 100 |

The PRIMAX film showed complete ink adhesion failure with all types of inks, while the FASCLEAR film showed only slightly better performance. Any level of failure is generally considered unacceptable.

Each of the label film samples was then evaluated for image transfer quality. Multicolored weather bar graphics were printed on SCOTCHPRINT™ 8601 transfer media from 3M in a SCOTCHPRINT™ 9512 electrostatic printer. The toned images were then transferred to the sample films using a Pro-Tech Model EGS-692 hot roll laminator set at 96° C. and 441 kPa (64 psi). An image was transferred to each sample at both 0.5 m/min (1.5 fpm) and 1.2 m/min (4 fpm). The imaged samples were examined for image transfer quality using visual standard method (VSM) ratings described in Example 2 and also tested for toner adhesion using the crosshatch test described in Example 1. Results are shown below.

| Test | PRIMAX label film | FASCLEAR label film |
| --- | --- | --- |
| Image transfer quality at 0.5 m/min | <4.0 | 9.5 |
| Image transfer quality at 1.2 m/min | <4.0 | <4.0 |
| Toner adhesion at 0.5 m/min | no removal | no removal |
| Toner adhesion at 1.2 m/min | some removal | no removal |

The PRIMAX film showed poor image transfer quality at both speeds (worse than the lowest possible rating). The FASCLEAR film showed good image transfer quality at the slower transfer rate, but poor image transfer quality at the faster transfer rate. By comparison, films described in the previous examples exhibited acceptable image transfer quality at transfer rates of up to 3.8 m/min (12.5 fpm).

The invention is not limited to the above embodiments. The claims follow.

What is claimed is:

1. An image receptor medium comprising an image reception layer having two major opposing surfaces, said image reception layer comprising an acid- or acid/acrylate-modified ethylene vinyl acetate (EVA) resin.

2. The image receptor medium of claim 1, further comprising a prime layer on a first major surface of the image reception layer, wherein the second major surface is a surface for receiving images.

3. An image receptor medium comprising:
   (a) a substrate layer comprising a polymer and having two opposing major surfaces; and
   (b) an image reception layer on a first major surface of the substrate layer having an outer surface for receiving images, said image reception layer comprising an acid- or acid/acrylate-modified ethylene vinyl acetate (EVA) resin.

4. The image receptor medium of claim 3, further comprising a prime layer on a second major surface of the substrate layer opposite the first major surface, the prime layer having an outer surface.

5. The image receptor medium of claim 4, further comprising an adhesive layer on the outer surface of the prime layer.

6. The image receptor medium of claim 3, further comprising an inkjet layer on the image reception surface of the image reception layer.

7. The image receptor medium of claim 3, wherein the polymer of the substrate layer is selected from the group consisting of polyolefin, polyester, polyamide, acrylic, polystyrene, polyurethane, polycarbonate, and polyvinyl chloride.

8. The image receptor medium of claim 3, wherein the polymer of the substrate layer is a propylene-ethylene copolymer.

9. The image receptor medium of claim 3, wherein the image reception layer comprises at least 60% by weight of the acid- or acid/acrylate-modified ethylene vinyl acrylate (EVA) resin.

10. The image receptor medium of claim 4, wherein the prime layer comprises an ethylene vinyl acetate resin and a filler.

11. The image receptor medium of claim 6, wherein the inkjet layer comprises at least one top coat layer of one composition and at least one bottom coat layer of a second composition, wherein the bottom coat layer contains dispersed particles of a size that causes protrusions from the top coat layer.

12. The image receptor medium of claim 11, wherein the dispersed particles in the bottom coat layer are cornstarch or modified cornstarch.

13. An image receptor medium comprising a coextruded multilayered film, said multilayered film comprising:

a substrate layer comprising a polymer and having two opposing major surfaces;

an image reception layer on a first major surface of the substrate layer having an outer surface for image reception, said image reception layer comprising an acid- or acid/acrylate-modified ethylene vinyl acetate (EVA) resin; and a prime layer on a second major surface of the substrate layer opposite the first major surface.

14. A method of making an image receptor medium comprising the steps of:

a) providing at least two charges, each charge comprising at least one film-forming resin;

b) coextruding said charges to form a multilayered film, wherein each layer of said multilayered film corresponds to one of said charges; said multilayered film comprising a substrate layer comprising a polymer and having two opposing major surfaces; and an image reception layer on a first major surface of the substrate layer having an outer surface for image reception, said image reception layer comprising an acid- or acid/acrylate-modified ethylene vinyl acetate (EVA) resin.

15. The method of claim 14, wherein the multilayered film further comprises a prime layer on the second major surface of the substrate layer opposite the first major surface, said prime layer having an outer surface.

16. The method of claim 15, further comprising the step of applying a layer of pressure sensitive adhesive to the outer surface of said prime layer.

17. A method of providing an image on an image receptor medium, comprising the steps of:

a) forming an image on an image transfer medium via electrography; and b) transferring the image of step a) on to an image receptor medium, the image receptor medium comprising a substrate layer comprising a polymer and having two opposing major surfaces; and an image reception layer on a first major surface of the substrate layer having an outer surface for image reception, said image reception layer comprising an acid- or acid/acrylate-modified ethylene vinyl acetate (EVA) resin.

18. A method of providing an image on an image receptor medium, comprising screen printing the image on the image receptor medium, the image receptor medium comprising a substrate layer comprising a polymer and having two opposing major surfaces; and an image reception layer on a first major surface of the substrate layer having an outer surface for image reception, said image reception layer comprising an acid- or acid/acrylate-modified ethylene vinyl acetate (EVA) resin.

19. A method of providing an image on an image receptor medium, comprising thermal inkjet printing the image on the image receptor medium, the image receptor medium comprising a substrate layer comprising a polymer and having two opposing major surfaces;

an image reception layer on a first major surface of the substrate layer having an outer surface for image reception, said image reception layer comprising an acid- or acid/acrylate-modified ethylene vinyl acetate (EVA) resin; and an inkjet layer on the image reception surface of the image reception layer.

20. A method of providing an image on an image receptor medium, comprising forming the image by thermal mass transfer on the image receptor medium, the image receptor medium comprising a substrate layer comprising a polymer and having two opposing major surfaces; and an image reception layer on a first major surface of the substrate layer having an outer surface for image reception, said image reception layer comprising an acid- or acid/acrylate-modified ethylene vinyl acetate (EVA) resin.

* * * * *